United States Patent [19]

Wessels

[11] Patent Number: 5,758,890
[45] Date of Patent: *Jun. 2, 1998

[54] LOCKING SYSTEM FOR A SEMITRAILER CHASSIS AND REMOVABLE CONTAINER

[75] Inventor: Larry L. Wessels, Lakewood, Colo.

[73] Assignee: Rocky Mountain Technology & Engineering Corp., Lakewood, Colo.

[*] Notice: The portion of the term of this patent subsequent to May 24, 2011, has been disclaimed.

[21] Appl. No.: 618,031

[22] Filed: Mar. 25, 1996

Related U.S. Application Data

[63] Continuation-in-part of Ser. No. 442,988, May 17, 1995, Pat. No. 5,314,201.

[51] Int. Cl.$^6$ ............................................ B62D 53/06
[52] U.S. Cl. .......................... 280/149.2; 280/423.1; 296/35.3; 410/91; 410/83; 414/84
[58] Field of Search ................... 280/149.2, 423.1, 280/418.1, DIG. 8; 296/35.3; 410/91, 83; 414/54, 80, 81, 84

[56] References Cited

U.S. PATENT DOCUMENTS

| | | | |
|---|---|---|---|
| 3,317,219 | 5/1967 | Hindin et al. | 280/149.2 |
| 3,924,544 | 12/1975 | Grau et al. | 410/83 |
| 4,013,017 | 3/1977 | Toyota et al. | 410/83 |
| 4,353,565 | 10/1982 | Smith et al. | 280/149.2 |
| 4,993,737 | 2/1991 | Torcomian | 280/149.2 |
| 5,131,673 | 7/1992 | Gleeson et al. | 280/DIG. 8 |
| 5,137,296 | 8/1992 | Forman | 280/149.2 |
| 5,199,732 | 4/1993 | Lands et al. | 280/149.2 |
| 5,297,858 | 3/1994 | Zupan | 410/80 |
| 5,314,201 | 5/1994 | Wessels | 280/149.2 |
| 5,465,990 | 11/1995 | Wessels | 280/149.2 |

FOREIGN PATENT DOCUMENTS

| | | | |
|---|---|---|---|
| 765052 | 9/1980 | U.S.S.R. | 410/80 |

Primary Examiner—Paul N. Dickson
Attorney, Agent, or Firm—Edwin H. Crabtree; Ramon L. Rizavvo; Donald W. Margolis

[57] ABSTRACT

A locking system for securing an expandable semitrailer chassis and for securing a removable container received on top of the chassis when the container is transported on the semitrailer. The expandable semitrailer allows for receiving different lengths of removable containers thereon. The semitrailer pulled by a tractor. In one embodiment the locking system is used with the expandable chassis for securing and releasing a telescoping rail slidably mounted inside a rail receiving member. The chassis includes the telescoping rail cross beam support members and rail receiving member. The chassis is supported on an undercarriage. The rail receiving member include spaced apart locking pin holes disposed along the length thereof. The locking system includes an air cylinders with piston. The air cylinder is mounted on a rail crossbar and disposed next to pin holes in the rail receiving member. A locking pin is attached to the piston with a portion of the locking pin inserted through a pin hole in the rail and through a selected locking pin hole in the rail receiving member when in a locked position. An air valve is connected to the air cylinder and a pressurized air source on the semitrailer. The air valve directs pressurized air to the air cylinder for retracting and extending the locking pin in the locking pin hole in the rail receiving member.

20 Claims, 4 Drawing Sheets

LOCKING SYSTEM FOR A SEMITRAILER CHASSIS AND REMOVABLE CONTAINER

This application is a continuation-in-part application of patent application Ser. No. 08/442,988, filed on May 17, 1995, now U.S. Pat. No. 5,314,201, by the subject inventor and having a title of "LOCKING SYSTEM FOR A SEMITRAILER SLIDING UNDERCARRIAGE WITH AIR PRESSURE PROTECTION VALVE".

BACKGROUND OF THE INVENTION (a) Field of the Invention

This invention relates to a locking system for semitrailers and more particularly, but not by way of limitation, to a locking pin system used for securing an expandable semitrailer chassis and for securing and releasing a removable container received on top of the chassis when the container is transported on the semitrailer.

(b) Discussion of Prior Art

A common truck transportation system in the United States is a tractor pulling a semitrailer. The tractor has an engine, transmission, steerable front axle with wheels and one or more rear drive axles and wheels. The tractor is attached to a semitrailer through a fifth wheel which is located over the tractor's rear drive axle. The semitrailer rides on a running gear or called herein a "sliding undercarriage". The sliding undercarriage includes a suspension, one or more unpowered axles, wheels, a pneumatic brake system and a locking pin release system. The sliding undercarriage is slidable along a portion of the length of the underside of the semitrailer. A locking system for a semitrailer sliding undercarriage is described in patent application Ser. No. 996,580 now U.S. Pat. No. 5,314,201 and Ser. No. 381,290 now U.S. Pat. No. 5,465,990 by the subject inventor. The structure of the locking system described in these two patents is incorporated herein by reference.

With the recent advent of different lengths of enclosed containers used for shipping various types of goods on land and sea, the trucking industry has developed an expandable semitrailer chassis for receiving the containers thereon. The container length will vary, as an example, from 45 feet, 48 feet and 53 feet and greater. Currently the telescoping chassis is secured using a manually operated pin locking system which is commonly used in releasing and securing the sliding undercarriage on the semitrailer. Also manually operated locking pins are used for securing the removable container on top of the expandable semitrailer chassis.

The sliding undercarriage, used with the expandable semitrailer chassis and removable container described herein, is typically locked between two parallel rails that are integral to the structure of the bottom frame of the semitrailer. Lateral movement relative to the semitrailer is limited to the clearance between the two rails and the sliding undercarriage frame. The sliding undercarriage can be moved longitudinally, generally five to seven feet, under the semitrailer by sliding along and between the two rails. The sliding undercarriage is locked to the semitrailer rails by a system of usually two or four steel pins that are part of the sliding undercarriage frame. The pins are aligned in opposing pairs in the sliding undercarriage structure and in a locked position project outward through locking pin holes in the rails. The locking pin holes are generally spaced three to six inches apart along the rails. The locking pins are usually spring loaded to retain them in a locked position during highway travel. The locking pins are retracted and reinserted in the locking pin holes using a manually operated pin release system.

Semitrailers are commonly equipped with pneumatic spring brake systems which typically operate at 90–120 psi. The spring loaded air brakes are automatically set by the springs when air pressure is removed through a control in the tractor which vents the supply air line and spring brake air lines to the atmosphere. To release the air brakes, air pressure from the tractor compressor is routed through the supply air line and a relay valve to apply pressure from an air supply tank to overcome the brake spring bias force. A pressure protection valve is connected directly to the air supply tank to prevent the depletion of air pressure during the operation of the semitrailer's air brakes. The features of the pressure protection valve are outlined in a patent application Ser. No. 442,988 filed on May 17, 1995 by the subject inventor. The structure of the pressure protection valve with locking system are incorporated herein by reference.

The most common way to reposition the expandable semitrailer chassis, similar to the sliding undercarriage, is through a process of trial and error. The driver locks the brakes on both the tractor and semitrailer. The driver then climbs out of the tractor, walks to the side of the chassis, and pulls or lifts the manually operated locking pin release lever connected to a pair of chassis locking pins securing a pair of telescoping rails slidably mounted inside a pair of rail receiving members.

Most Original Equipment Manufacturer (OEM) manually operated locking pin release systems are a mechanical apparatus designed to rotate when the locking pin release lever is pulled or lifted. The pins are retracted by a pulling or a lifting force transmitted through a series of linkages designed to provide a mechanical advantage to overcome the spring loaded locking pin retention force. The pin release apparatus usually includes provisions to hold the lever and locking pins in a retracted position while the driver returns to the tractor. The driver then releases the brakes on the tractor while leaving the brakes applied on the semitrailer's sliding undercarriage. The tractor is then driven forward or backward to slide the telescoping rails inside the rail receiving members. The driver, after sliding the telescoping rails the distance considered correct, then reapplies the tractor brakes. The driver again leaves the tractor, walks back to the chassis, and releases or pushes down the pin release lever. The spring loaded locking pins are usually not perfectly aligned to reinsert through locking holes. Each locking pin, when not fully reinserted, is pressed by the locking pin retaining spring against the rail receiving members at a location between two locking pin holes. The driver returns to the tractor, releases the tractor brakes, and moves the semitrailer only a few inches or less as required for the spring loaded pins to drop into the first holes in the rail receiving members that move into alignment. The driver must then reapply the brakes and walk around the semitrailer to visually verify that the pins are in a locked position. The driver then secures the locking pin release lever to the chassis for highway travel.

The process of retracting the locking pins and sliding the telescoping rails in the rail receiving members is more easily completed with the assistance of a second person. The second person pulls or lifts the locking pin release lever and assists the driver in repositioning the parallel rails in the rail receiving members. The manually operated pin retraction systems can become impossible to operate due to damage or corrosion of the linkage and contamination with dirt and ice from exposure under the semitrailer. Locking pins can also become stuck in the holes in the rail receiving members if the semitrailer is parked on an incline or positioned with a slight twist in the frame. Pins are often loosened only by pounding them out with hammers. The usual procedure to loosen stuck locking pins is to apply the brakes on the sliding undercarriage and rock the semitrailer by repeatedly driving the tractor forward and backward a few inches. The assistant provides a constant pull on the pin release lever to apply the maximum force possible to overcome the locking pin springs and withdraw the pins if they become loose. Similar problems are often encountered in trying to reinsert locking pins. Extra force and assistance to align individual pins may be required to reinsert locking pins into new locking holes after the telescoping rails have been repositioned. The locking pin linkage can be damaged, bent, or twisted during attempts to loosen stuck pins. Distorted linkage may limit the distance that locking pins can be reinserted and make it impossible to reinsert pins into locked positions. The assistant positioned under the semitrailer near the wheels during attempts to loosen stuck locking pins or reinsert pins can be seriously injured. Bad weather such as rain, ice, and snow increase the probability of injury to an assistant positioned near the sliding undercarriage wheels.

The problems inherent in retracting and inserting locking pins with the above mentioned manually operated pin retraction apparatus have been recognized in U.S. Pat. No. 4,944,522 to Hart, U.S. Pat. No. 4,838,578 to Baxter, U.S. Pat. No. 4,353,565 to Smith et al., U.S. Pat. No. 4,286,797 to Mekosh et al., U.S. Pat. No. 3,778,079 to Vornberger, U.S. Pat. No. 3,618,969 to Glassmeye, U.S. Pat. No. 5,199,732 to Lands et al., and U.S. Pat. No. 5,137,296 to Forman.

The above mentioned patents to Hart and Baxter provide means to modify the manually operated pin retraction apparatus. The modified systems as described do not provide sufficient force to retract stuck locking pins, especially when complicated by corrosion, damage or contamination. Also, the flexibility of the modified linkage described in these patents is an inefficient means to reinsert locking pins into the locking pin holes. Also, bent linkage may actually prevent the locking pins from being fully inserted into locked positions even when the control lever position indicates that all pins are locked.

In the patents to Smith et al. and to Mekosh et al. complex electromechanical and pneumatic systems are disclosed that require extensive structural modifications to the semitrailer and possibly to the tractor. The patent to Smith et al. describes a few of the features incorporated into the novel system described herein, but the Smith et al. disclosure, for example, does not include a system wherein a pressure transducer provides control to automatically reinsert the locking pins should a semitrailer's spring brakes be released when the locking pins are retracted. Also, the system prevents the locking pins from being retracted unless the driver sets the semitrailer brakes before adjusting the expandable semitrailer chassis and removing locking pins securing the removable container.

The patents to Lands et al. and Forman provide air operated cylinders and locking pins which are pneumatically released by the cylinders. But the systems described in these two patents do not provide a locking pin system which prevents the locking pins from being retracted unless the semitrailer brakes are set and will automatically reset the pins if air pressure is applied to release the semitrailer brakes.

None of the above mentioned patents disclosed the unique features and advantages of the subject locking system as described herein for improved efficiency and safety in the adjustment of an expandable semitrailer chassis and for securing and releasing a removable container received on top of the chassis.

SUMMARY OF THE INVENTION

In view of the foregoing, it is a primary object of the invention to provide a truck driver and truck owner the benefit of a reliable and safe system which can easily help reposition an expandable semitrailer chassis without potential injury to the driver or assistant.

Another object of the present invention is to provide a system wherein each locking pin is independently retracted and inserted by a double acting air cylinder. The system is designed to transmit adequate force, i.e. over 150 pounds, directly to each locking pin and reliably retract pins stuck in the expandable chassis and the container's locking pin holes.

A further object of the locking system is the locking pins can only be retracted when the pressure in the semitrailer's spring brake chambers is vented to apply the spring brakes on the semitrailer. If the spring brakes on the semitrailer have not been set, an air pressure switch connected to a 4-way air valve prevents the air valve from actuating the air cylinders to retract the locking pins in the expandable chassis and the corners of the removable container on top of the chassis.

Another object of the new system is the double acting air cylinders provide insertion force greater than and in addition to locking pin springs used to retain each locking pin in a locked position on the expandable chassis and container during highway travel.

Still another object of the invention is the system does not affect the operation of the tractor or semitrailer's electrical or pneumatic system. Specifically, the operation of the semitrailer's pneumatic spring brake system is not affected by the system's elements, unlike some prior art systems.

Yet another object of the invention is the simplicity and low cost of the locking system. Also, the installed cost of the system is comparable to the standard manually operated pin removal mechanism currently used on semitrailers. Further, the system can easily be installed as original equipment on the semitrailer's chassis or retrofited on semitrailers already in use.

A further object of the invention is to eliminate the use of unsafe and difficult to use manually operated pin removal linkage mechanisms which are currently standard equipment on semitrailers.

The subject locking system is used for securing and releasing removable containers and a pair of telescoping parallel rails slidably mounted inside a pair of rail receiving members. The chassis includes the telescoping rails, cross beam support members and rail receiving members. The chassis is supported on a sliding undercarriage. The rail receiving members include spaced apart locking pin holes disposed along the length thereof. The locking system includes a pair of air cylinders with pistons. The air cylinders are mounted on a rail crossbar and disposed next to pin holes in the rail receiving members. Locking pins are attached to each piston with a portion of the locking pins inserted through the pin holes in the rails and through selected locking pins holes in the rail receiving members when in a locked position. An air valve is connected to the air cylinders and a pressurized air source on the semitrailer. The air valve directs pressurized air to the air cylinders for retracting and extending the locking pins in the locking pin holes in the rail receiving members.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
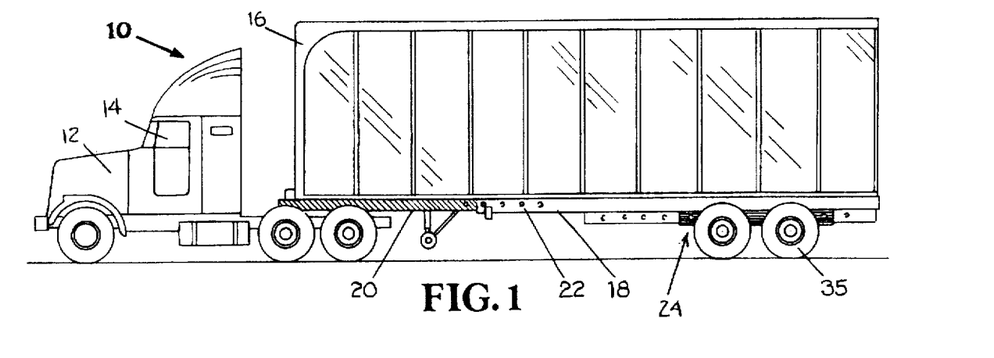
FIG. 1 is a side view of a typical highway tractor and semitrailer with a longitudinally sliding undercarriage mounted on the underside of the rear of the semitrailer.

In FIG. 1 a side view of a typical highway truck is shown having a general reference numeral 10. The truck 10 includes a tractor 12 with cab 14 with the tractor 12 pulling a semitrailer 16. The semitrailer 16 has a pair of parallel rails 18 mounted on an underside 20 of the semitrailer 16. The rails 18 include a plurality of pin locking holes 22 along the length thereof. The holes 22 are generally spaced 3 to 6 inches apart. A sliding undercarriage, having a general reference numeral 24, is locked to the rails 18 using one or more locking pins 26. While the sliding undercarriage 24 is shown herein, it can be appreciated by those skilled in the art that the locking system described herein will work equally well with a fixed undercarriage. The sliding undercarriage 24 includes an axle frame with cross members, a spring suspension attached to the frame 28, a pair of axles 32 attached to the spring suspension and tandem front wheels 34 and tandem rear wheels 35 mounted on the axles 32.

The undercarriage 24 also includes a semitrailer supply air tank with pressure protection valve. The air tank and pressure protection valve are not shown in the drawings. The air tank supplies compressed air to spring operated air brakes. When air pressure is applied to the air brakes, the spring bias force in the air brakes is overcome unlocking the braking force on the semitrailer's wheels 34 and 35 and the semitrailer 16 is free to move. When the air pressure is vented or cut off for any reason, the spring bias force of the air brakes is applied and a constant braking force is applied the wheels 34 and 35. The tank receives pressurized air from a tractor air compressor via a supply air line. The air compressor is mounted on the tractor 12 and not shown in the drawings. Also, the tractor 12 and semitrailer 16 include 12 volt electrical power with leads for running lights, starter, electrical switching and other electrical equipment on the unit.

Figure 2:
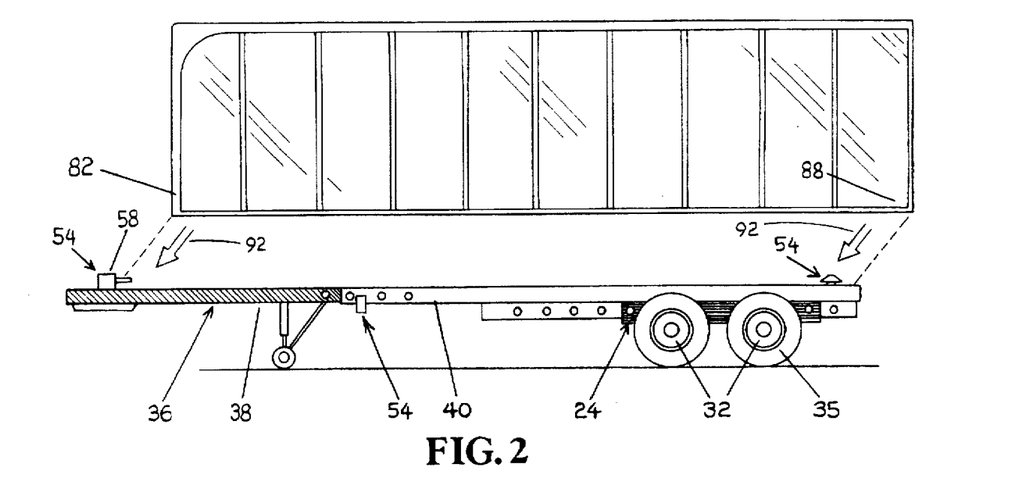
FIG. 2 is a side view of a removable container positioned above the expandable chassis of the semitrailer.
Figure 3:
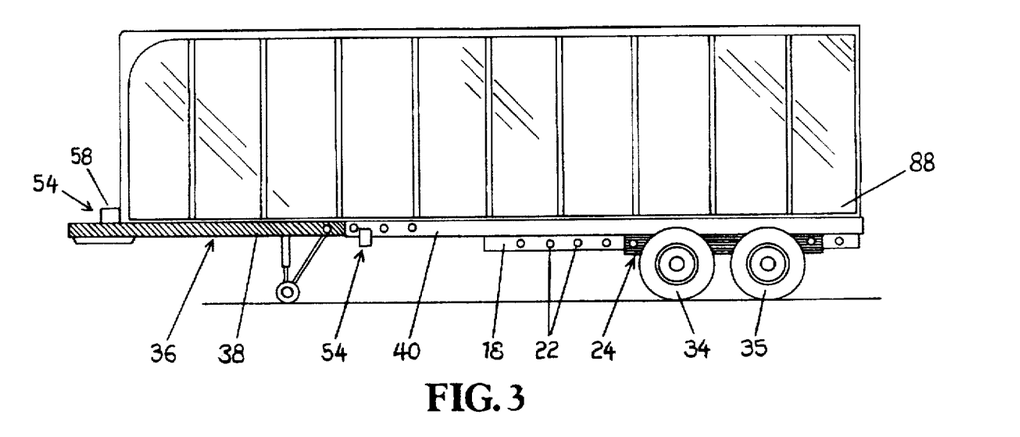
FIG. 3 is a side view of the removable container received on top the expandable chassis and secured thereto.
Figure 4:
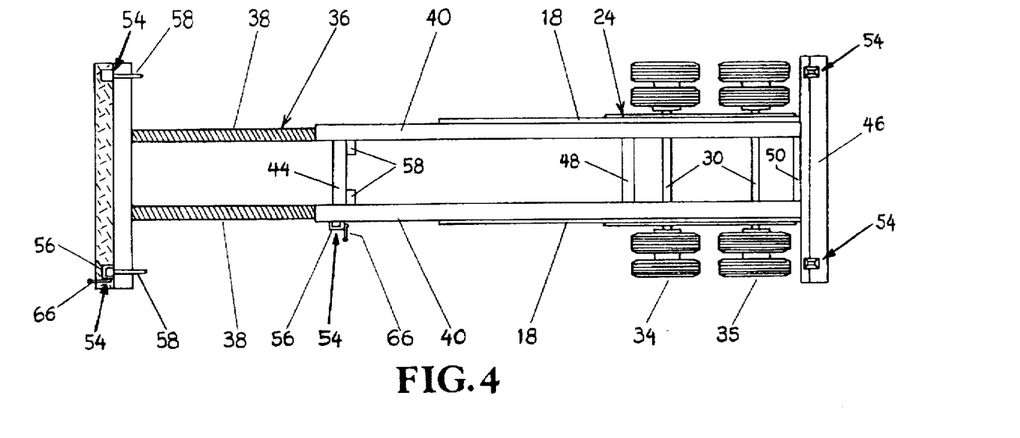
FIG. 4 is a top view of the expandable semitrailer showing the location of air cylinders and air valves used in the subject locking system.

In FIGS. 2, 3 and 4, the sliding undercarriage 24 is shown mounted on an expandable semitrailer chassis having general reference numeral 36. The chassis 36 includes a pair of parallel telescoping "C" shaped rails 38 with a portion of the rails 38 slidable received inside a pair of "C" shaped rail receiving members 40. A front cross member 42 is secured to a front end of the rails 38 and a sliding cross member 44 is secured to a rear end of the rails 38. A rear cross member 46 is secured to a rear end of the rail receiving members 40 and an additional pair of cross members 48 and 50 are used to support the chassis 36 and the sliding undercarriage 24. While the chassis 36 is shown in the drawings with a pair of rails 38, the chassis 36 in another embodiment could have a single rail 38 received in a rail receiving member 40.

In FIG. 2, an enclosed container 52 is shown disposed above the chassis 36 and in FIG. 3 the container 52 is secured to the top of the chassis 36. As mentioned above, the container 52 comes in different lengths such as 45 feet, 48 feet, 53 feet and greater and therefore the chassis 36 most be expandable and retractable to accommodate different lengths of containers 36.

Figure 5:
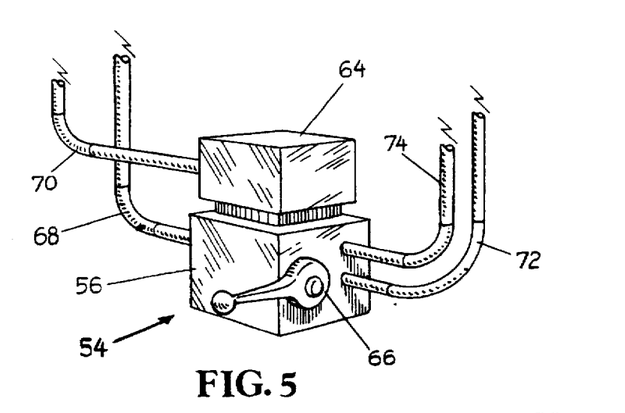
FIG. 5 is an enlarged perspective view of an air pressure switch and 4-way air valve with pin release lever.
Figure 6:
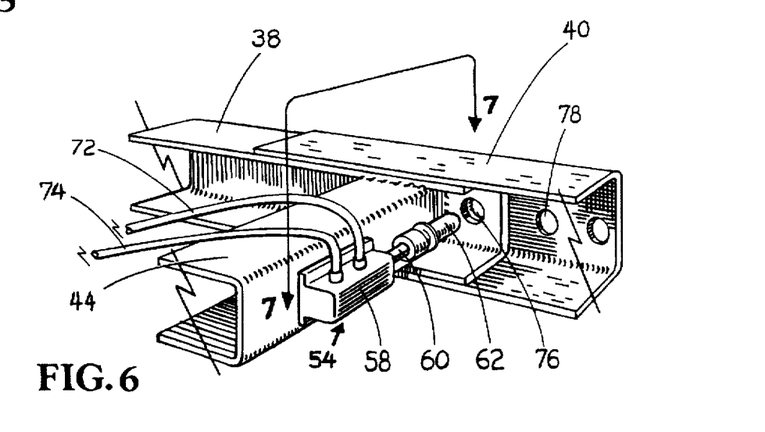
FIG. 6 is a perspective view of an air cylinder and piston with locking pin positioned for insertion into a selected locking pin hole on the rail receiving member.

In FIGS. 4, 5, and 6 the subject locking system for the semitrailer chassis 36 and the removable container 52 is designated by general reference numeral 54. Referring to these figures, the locking system 54 broadly includes a 4-way air valve 56, double acting air cylinders 58 with pistons 60 connected to the locking pins 62, an air pressure switch 64 mounted on one end of the 4-way air valve 54, and a pin release lever 66 mounted on an opposite end of the air valve 54.

In FIG. 5, the 4-way air valve 56 is connected to the supply air tank by air valve air line 68. The air pressure switch 64 is connected to the semitrailer's air brake line 70. While the air value 56 and the air pressure switch 64 are pneumatically controlled, they may also be connected to the semitrailer's electrical system and operated using electrical "on" and "off" switching for controlling the retracting and extension of the locking pins 62. Also, the air valve 56 is connected to each of the locking system's air cylinders 58 by way of an air line 72 used for retracting the piston 60 in the air cylinder 58 and an air line 74 used for extending the piston 60 and inserting the locking pin 62 in a locking pin hole 76 in the telescoping rails 38, in selected locking pin holes 78 in the rail receiving members 40 or in the locking pin holes 80 in the corners of the container 52.

Figure 7:
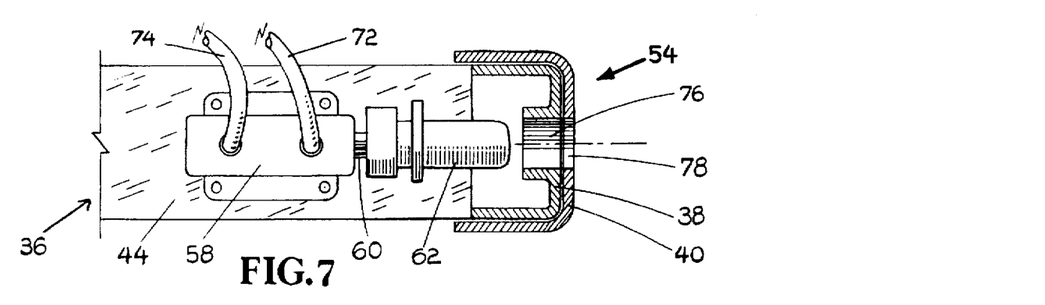
FIG. 7 is a sectional view of a sliding rail and rail receiving member taken along lines 7—7 shown in FIG. 6 with a locking pin in position for insertion into locking pin holes in the sliding rail and the rail receiving member.
Figure 8:
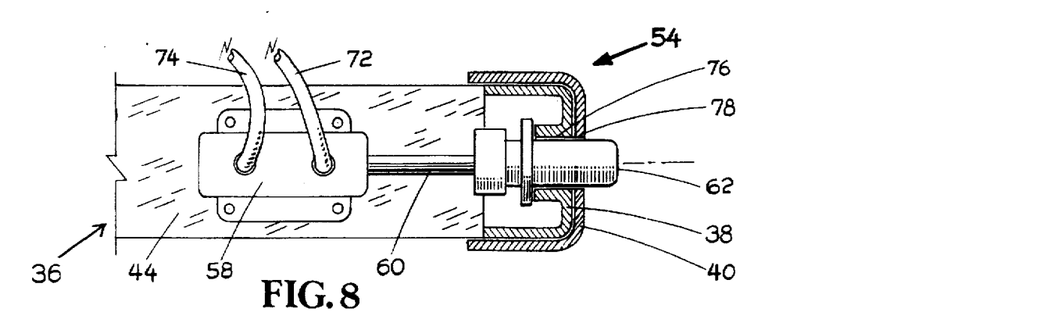
FIG. 8 is a sectional view similar to FIG. 7 with the locking pin inserted into the locking pin hole in the sliding rail and the rail receiving member.

In FIGS. 6, 7 and 8, the locking system 54 for the expandable chassis 36 is illustrated and operated by the air valve 56 and air lines shown in FIG. 5. In FIG. 6, a perspective view of one end of a telescoping rail 38 is shown received in a portion of a rail receiving member 40 having a plurality of locking pin holes 78 therein. In this drawing the locking pin 62 is in a retracted position ready for insertion through the locking pin hole 76 in the rail 38 and a selected locking pin hole 78 in the rail receiving member 40.

In FIGS. 7 and 8, a side sectional view of the rail 38 and rail receiving member 40 are shown taken along lines 7—7 shown in FIG. 6. In FIG. 7, the locking pin 62 is in a retracted position as shown in FIG. 6. In FIG. 8, the pin release lever 66 mounted on the side of one of the rails 38 as shown in FIG. 4 has been operated and the air valve 56 has actuated the cylinder 58 with the piston 60 and locking pin 62 moved to the right. The locking pin 62 has been received through the locking pin hole 76 and through the selected locking pin hole 78 in the rail receiving member 40. The rail 38 is now secured to the rail receiving member 40 and the chassis 36 is held in a selected expanded position. While FIGS. 6, 7 and 8 show only one of the locking pins 62 and air cylinders 58 used with the expandable chassis 36, the other locking pin 62 and air cylinder 58 used with the other parallel rail 38 and rail receiving member 40 would operate in the same manner and at the same time as described above when using the air valve 56 and pin release lever 66 when retracting and extending the locking pins 62.

Figure 9:
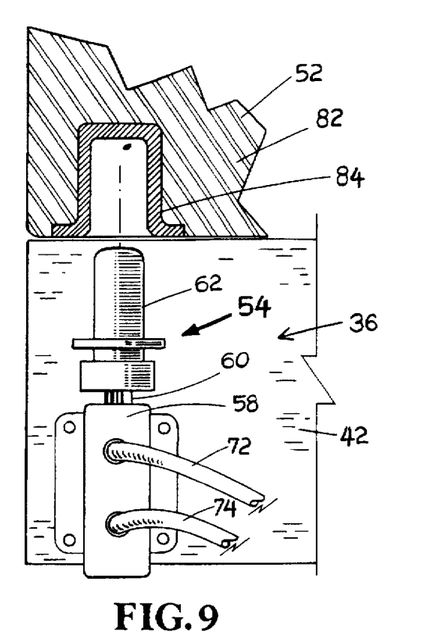
FIG. 9 is a top view of a locking pin in position for insertion into a locking pin collar mounted in a front corner of the removable container. A portion of the container has been cut away to illustrate the locking pin collar.
Figure 10:
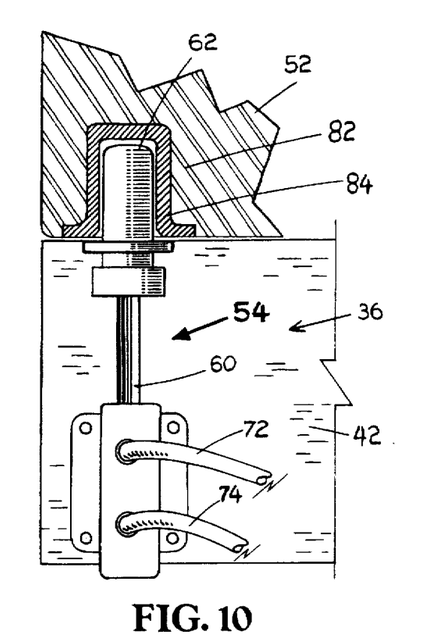
FIG. 10 is a top view similar to FIG. 9 wherein the locking pin is inserted into the locking pin collar mounted in the removable container.

In FIGS. 9 and 10 a top view of another embodiment of the locking system 54 is illustrated for securing the removable container 52. In these drawings, one of the air cylinders 58 is mounted horizontally on the front cross member 42. The air cylinder 58 is operated by the air valve 56, the air pressure switch 64 and the pin release lever 66 shown in shown in FIGS. 4 and 5. In a front corner 82 of the container 52 is mounted a pin receiving collar 84 for receiving a locking pin 62. While the collar 84 is shown in the drawings it can be appreciated that various time of pin receiving devices and aperture will work equally well for engaging the locking pin 62. In FIG. 9, the locking pin is disposed next to the front of the collar 84 and indexed for receipt therein. In FIG. 10, the air cylinder 58 has been actuated by using the pin release lever 66 and the locking pin 62 has been extended into the pin receiving collar 84. In this locked position the container 52 is secured to the top of the chassis 36. While only one of the locking pins 62 are shown in the drawings for securing one of the corners of the container 52, it can be appreciated that an air cylinder 58 with piston 60 and locking pin 62 can be used for securing the front two corners of the container and the rear two corners. Also, while the locking pin 62 shown in FIGS. 9 and 10 is mounted horizontally, the pin 62 or pins 62 could be mounted vertically for engaging the corners of the container 52 and securing the container 52 to the chassis 36.

Figure 11:
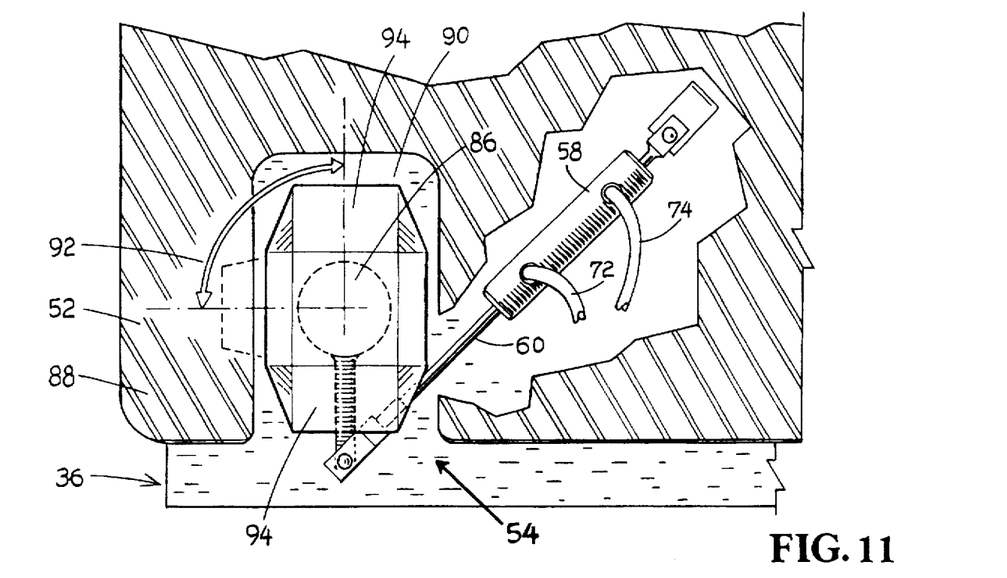
FIG. 11 is a top view of a locking latch received between a "U" shaped slot in a rear corner of the removable container. A portion of the container has been cut away to expose an air cylinder and piston attached to the locking latch.
Figure 12:
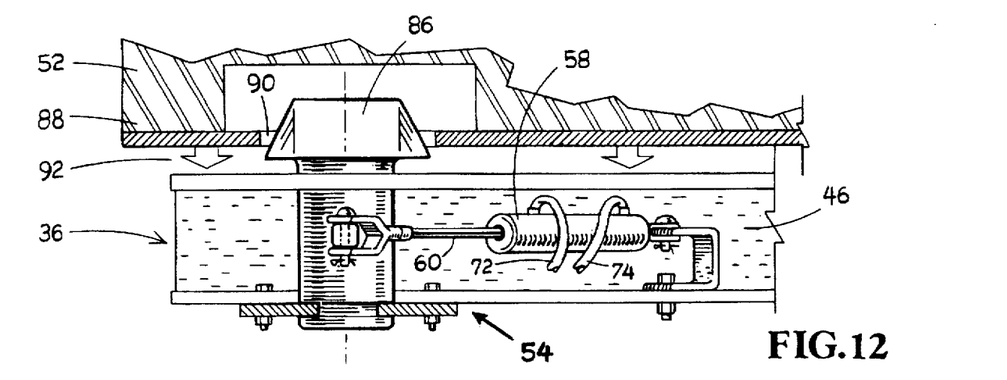
FIG. 12 is a rear view of the locking latch with the air cylinder and piston in an unlocked position.
Figure 13:
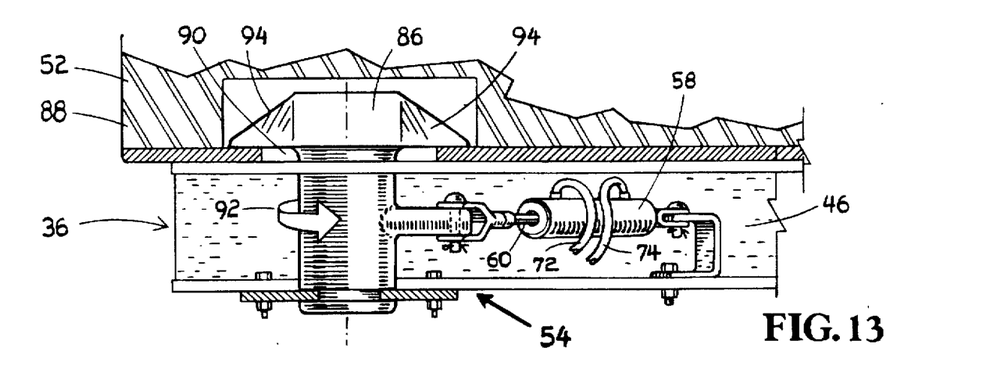
FIG. 13 is a rear view of the locking latch with the air cylinder and piston rotating the latch in a locked position for holding the container on top of the chassis.

In FIGS. 11, 12 and 13, the use of a locking latch 86 rather than a locking pin 62 is illustrated attached to an air cylinder 58 and piston 60. For example, in this embodiment rear corners 88 of the container 52 include a "U" shaped slot 90 in the bottom of the container 52. When the container 52 is set on top of the chassis 36 as shown in FIG. 3, the locking latch 86 in an unlocked position is received through the slot 90. In FIGS. 11 and 12, the locking latch 86 is shown in an unlocked position with the container 52 positioned for receipt on top of the chassis 36.

In FIG. 13, the container 52 has been received on top of the chassis 36. The air cylinder 58 has been actuated by the air valve 56 using the pin release lever 66 or in this case a latch release lever 66 and the locking latch 86 has been rotated 90 degrees as indicated by arrow 92 shown in FIG. 11. Extended sides 94 of the locking latch 86 now engage the top of a lower portion of the container 52 next to the "U" shaped slot 90. The locking latch 86 with air cylinder 58 and piston 60 are used for securing the rear corners 88 of the container 52. While the locking latch 86 and the locking pins 62 are shown for securing the container 52 to the chassis 36, it can be appreciated that various combinations of the latches 86 and pins 62 can be used for securing the removable container 52 without departing from the spirit and scope of the subject locking system as described herein.

OPERATION OF LOCKING SYSTEM

The operation of the locking system 54 will now be described in conjunction with the above discussion of the drawings. As background information, it should be mentioned that the 4-way air valve 56 receives air pressure from the semitrailer's air tank for the operation of the air cylinders 58. The pressure in the semitrailer's air brake system is monitored by the air pressure switch 64. It has been found that semitrailer supply air tanks typically have threaded plugs which are provided by the tank manufacturer to allow devices such as an air spring suspension or power lift platform to be added to the semitrailer. Therefore, connecting the 4-way air valve 56 and air cylinders 58 to the semitrailer's air tank and adding air pressure switch 64 for monitoring pressure in the air brake system does not effect the operation of the semitrailer's air brake system. It is important to note the air pressure switch 64 prevents operation of the 4-way air valve 56 and is a fail-safe feature of the locking system 54. If the air brake system is pressurized, then the air brakes have been released and therefore the air pressure switch 64 is pressurized and the pin release lever 66 is prevented from operating the air valve 56 and applying air pressure through the air line 72 for having the air cylinders 58 retract the locking pins 62. Air valve 56 in the fail-safe position does provide air pressure to the air cylinders 58 through the air line 74 continually force the locking pins 62 into locked positions.

If the semitrailer's air brakes are set by venting the air pressure via air brake lines 70 to the air brakes, then the air pressure is vented to the air pressure switch 64. When this occurs, the operator of the truck 10 or an assistant can now operate the pin release lever 66 on the air valve 56 for retracting the locking pins 62 engaging the telescoping rails 38 to the rail receiving members 40 or the locking pins 62 or locking latches 86 used for securing the container 52 to the chassis 36. While the pin release lever 66 is shown, it can be appreciated that a pin release button or any other type of release mechanism can be used equally well in the operation of the 4-way air valve 56. At this time the air valve 56 directs air pressure through air line 72 to the two air cylinders 58 to actuate the cylinders and retract the pistons 60 which in turn retract the locking pins 62 from the rail receiving members 40 or the corners of the container 52. The air pressure force, over 150 pounds, is sufficient to remove the pins 62 even though the pins 62 may be stuck inside the locking pin holes 78 or collars 84. When the cylinders 58 are actuated, the air pressure on the opposite side of the piston 60 is vented through air line 74 and the air valve 56.

When the locking pins 62 have been removed from the rail receiving members 40 or the corners of the container 52, the telescoping rails 38 are now ready to be repositioned on the rail receiving members 40 or the container 52 removed from the chassis 36. After the driver has properly repositioned the telescoping rails 38 at a new location on the rail receiving members 40 or a new container 52 is placed on the chassis 36, the pin release lever 66 is used to reverse the direction of air pressure from the air line 68 and now through the air line 74 to again extend the pistons 60 and the locking pins 62 into a locked position in newly selected pin locking holes 78 or collars 84. Air pressure on the opposite end of the air cylinder 58 is now vented through air line 72 and the air valve 56.

The above reinsertion of the locking pins 62 into newly selected pin holes 78 or collar 84 can also be accomplished by the driver of the truck 10 pressurizing the semitrailer's air brakes to release the brakes. At this time, the air pressure switch 64 senses the increase in air pressure and opens the air valve 56. Automatically, air pressure is directed through the air valve 56 and air line 74 to extend the pistons 60 of the cylinders 58 for extending the locking pins 62 into a locked position.

Upon completion of the changing of the position of the expandable chassis 36 on the sliding undercarriage 24 or changing the container 52 using the subject fail-safe locking system 54, if the semitrailer's air brakes are still set, air pressure can now be applied to the air brakes by the truck's driver to release the brakes. The tractor 12 and semitrailer 16 are now ready for being driven safely on the highway.

While the invention has been particularly shown, described and illustrated in detail with reference to the preferred embodiments and modifications thereof, it should be understood by those skilled in the art that the foregoing and other modifications are exemplary only, and that equivalent changes in form and detail may be made therein without departing from the true spirit and scope of the invention as claimed, except as precluded by the prior art.

The embodiments of the invention for which an exclusive privilege and property right is claimed are defined as follows:

1. A locking system securing a semitrailer expandable chassis mounted on an undercarriage, the undercarriage having semitrailer spring operated air brakes operated from a pressurized air source on the semitrailer or tractor, the semitrailer having an electrical power source from the tractor, the locking system used with the expandable chassis for securing and releasing a telescoping rail slidably mounted inside a rail receiving member, the rail receiving member having locking pin holes therein, the locking system comprising:

at least one locking pin;

pneumatic locking pin insertion and retraction means mounted on the chassis and attached to said at least one locking pin for inserting and retracting said at least one locking pin in selected locking pin holes in the rail receiving member; and switch and valve means for allowing retracting said at least one locking pin from the locking pin holes only when the semitrailer brakes on the undercarriage are set, said switch and valve means connected to said insertion and retraction means and the pressurized air source on the semitrailer or tractor.

2. The locking system as described in claim 1 wherein said locking pin insertion and retraction means is an air cylinder with piston, said air cylinder mounted on the chassis, said piston attached to said at least one locking pin.

3. The locking system as described in claim 2 wherein said air cylinder is a double acting air cylinder.

4. The locking system as described in claim 1 wherein said switch and valve means is an air pressure switch and an air valve, said air pressure switch connected to said air valve, said air pressure switch and said air valve connected to the pressurized air source on the semitrailer or tractor.

5. The locking system as described in claim 4 wherein said air pressure switch is connected to an air brake line connected to the spring operated air brakes and to the pressurized air source on the semitrailer or tractor.

6. The locking system as described in claim 1 wherein said switch and valve means is an air pressure switch and an air valve, said air pressure switch connected to said air valve, said air pressure switch and said air valve connected to the pressurized air source on the semitrailer or tractor and connected to an electrical "on" and "off" switch on the semitrailer for operating the air pressure switch and air valve, said "on" and "off" switch connected to the electrical power source on the semitrailer.

7. The locking system as described in claim 4 wherein said air valve provides air pressure from the pressurized air source to said insertion and retraction means for inserting said locking pin into a selected locking pin hole when the semitrailer is parked and when the air brakes have been set and air pressure is vented to the air brakes.

8. The locking system as described in claim 4 wherein said air valve provides air pressure from the pressurized air source to said insertion and retraction means for automatically reinserting said locking pin into an unselected locking pin hole when air pressure is applied to the air brakes for releasing the air brakes during a startup of the tractor and semitrailer.

9. The locking system as described in claim 4 wherein said air valve provides continuous air pressure from the pressurized air source to said insertion and retraction means for continually forcing said locking pin in the locking pin hole when air pressure has been applied to the air brakes and the air brakes have been released during highway travel of the tractor and semitrailer.

10. A locking system securing a semitrailer expandable chassis mounted on an undercarriage and securing a removable container on top of the chassis, the undercarriage having semitrailer spring operated air brakes operated from a pressurized air source on the semitrailer or tractor, the semitrailer having an electrical power source from the tractor, the locking system used with the expandable chassis for securing and releasing a pair of telescoping parallel rails slidably mounted inside a pair of rail receiving members, the rail receiving members having locking pin holes therein, the locking system used with the expandable chassis for securing and releasing the container on the chassis, the locking system comprising:

a pair of rail locking pins;

rail pneumatic locking pin insertion and retraction means mounted on the chassis and attached to each of said rail locking pins for inserting and retracting said rail locking pins in selected locking pin holes in the rail receiving members;

locking pin switch and valve means for allowing retracting of each of said rail locking pins from the locking pin holes only when the semitrailer brakes on the undercarriage are set, said locking pin switch and valve means connected to said insertion and retraction means and the pressurized air source on the semitrailer or tractor;

container engaging means for engaging and releasing the container on top of the chassis;

container pneumatic insertion and retraction means mounted on the chassis and attached to said container engaging means for inserting and retracting said container engaging means in the container; and container switch and valve means for allowing retracting of said container engaging means only when the semitrailer brakes on the undercarriage are set, said container switch and valve means connected to said container insertion and retraction means and the pressurized air source on the semitrailer or tractor.

11. The locking system as described in claim 10 wherein said container engaging means for engaging and releasing the container on top of the chassis is at least one container locking pin.

12. The locking system as described in claim 10 wherein said container engaging means for engaging and releasing the container on top of the chassis is at least one container locking latch.

13. The locking system as described in claim 10 wherein said container pneumatic insertion and retraction means is an air cylinder and piston.

14. The locking system as described in claim 10 wherein said locking pin switch and valve means is an locking pin air pressure switch and a locking pin air valve, said locking pin air pressure switch connected to said locking pin air valve, said locking pin air pressure switch and said locking pin air valve connected to the pressurized air source on the semitrailer or tractor.

15. The locking system as described in claim 14 wherein said locking pin air pressure switch is connected to an air brake line connected to the spring operated air brakes and to the pressurized air source on the semitrailer or tractor.

16. The locking system as described in claim 10 wherein said locking pin switch and valve means is a locking pin air pressure switch and a locking pin air valve, said locking pin air pressure switch connected to said locking pin air valve, said locking pin air pressure switch and said locking pin air valve connected to the pressurized air source on the semitrailer or tractor and connected to an electrical "on" and "off" switch on the semitrailer for operating said locking pin air pressure switch and said air valve, said "on" and "off" switch connected to the electrical power source on the semitrailer.

17. The locking system as described in claim 10 wherein said container switch and valve means is a container air pressure switch and a container air valve, said container air pressure switch connected to said container air valve, said container air pressure switch and said container air valve connected to the pressurized air source on the semitrailer or tractor and connected to an electrical container "on" and "off" switch on the semitrailer for operating said container air pressure switch and said container air valve, said "on" and "off" switch connected to the electrical power source on the semitrailer.

18. The locking system as described in claim 15 wherein said air valve provides air pressure from the pressurized air source to said insertion and retraction means for inserting said rail locking pins into selected locking pin holes when the semitrailer is parked and when the air brakes have been set and air pressure is vented to the air brakes.

19. The locking system as described in claim 15 wherein said air valve provides air pressure from the pressurized air source to said insertion and retraction means for automatically reinserting said rail locking pins into unselected locking pin holes when air pressure is applied to the air brakes for releasing the air brakes during a startup of the tractor and semitrailer.

20. The locking system as described in claim 15 wherein said air valve provides continuous air pressure from the pressurized air source to said insertion and retraction means for continually forcing said rail locking pins in the locking pin holes when air pressure has been applied to the air brakes and the air brakes have been released during highway travel of the tractor and semitrailer.

* * * * *